United States Patent [19]
Albright et al.

[11] 3,931,910
[45] Jan. 13, 1976

[54] CLOSURE LID FOR CLOSING THE OPENING OF A FOOD COOKING RECEPTACLE

[75] Inventors: Charles Jere Albright, Chicago; Clifford E. Fitch, Sr.; Clifford E. Fitch, Jr., both of Chicago Heights, all of Ill.

[73] Assignee: Chemetron Corporation, Chicago, Ill.

[22] Filed: June 7, 1973

[21] Appl. No.: 367,724

Related U.S. Application Data

[60] Division of Ser. No. 184,892, Sept. 29, 1971, Pat. No. 3,778,524, which is a continuation-in-part of Ser. No. 793,392, Jan. 23, 1969, abandoned.

[52] U.S. Cl. ............... 220/329; 220/244; 220/331; 220/335; 220/345; 220/378; 248/204; 248/317
[51] Int. Cl.² ................. A47J 36/06; A47J 36/10; A47J 36/12
[58] Field of Search ........ 220/55 PC, 25, 55.3, 329, 220/335, 348, 351, 336, 337, 244, 378, 331, 345; 248/146, DIG. 7, 278, 280, 293, 204, 317; 99/407, 408

[56] References Cited
UNITED STATES PATENTS

| | | | |
|---|---|---|---|
| 174,669 | 3/1876 | Ford | 248/204 |
| 563,635 | 7/1896 | Wiseman | 248/317 |
| 2,026,799 | 1/1936 | Ragonnet | 220/25 |
| 2,156,166 | 4/1939 | Smith | 220/25 |
| 2,181,195 | 11/1939 | McIlrath | 220/3 |
| 2,938,648 | 5/1960 | Phelan et al. | 220/55.3 |
| 2,955,452 | 10/1960 | Myers | 220/336 |
| 2,998,218 | 8/1961 | Elward | 248/DIG. 7 |
| 3,235,213 | 2/1966 | Hall | 248/146 |
| 3,655,411 | 4/1972 | Albright | 99/407 |
| 3,750,825 | 8/1973 | Bachle | 220/335 |

FOREIGN PATENTS OR APPLICATIONS

| | | | |
|---|---|---|---|
| 310,852 | 8/1930 | United Kingdom | 220/55 PC |

*Primary Examiner*—William T. Dixson, Jr.
*Assistant Examiner*—Allan N. Shoap
*Attorney, Agent, or Firm*—Shoemaker and Mattare

[57] ABSTRACT

A closure lid for effecting an air-tight seal of the opening in a receptacle for the pressurized cooking of food in high temperature, non-aqueous liquids, wherein the closure lid is manually positioned through said opening into the receptacle and is held upwardly into sealing engagement with the rim of said opening by the pressure in said receptacle, said closure lid being manually removable from said opening when the pressure in said receptacle is released.

7 Claims, 13 Drawing Figures

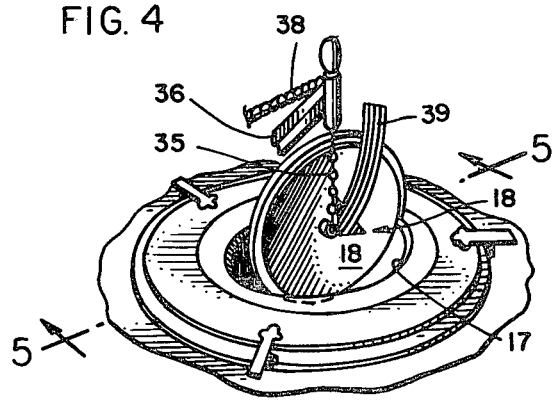
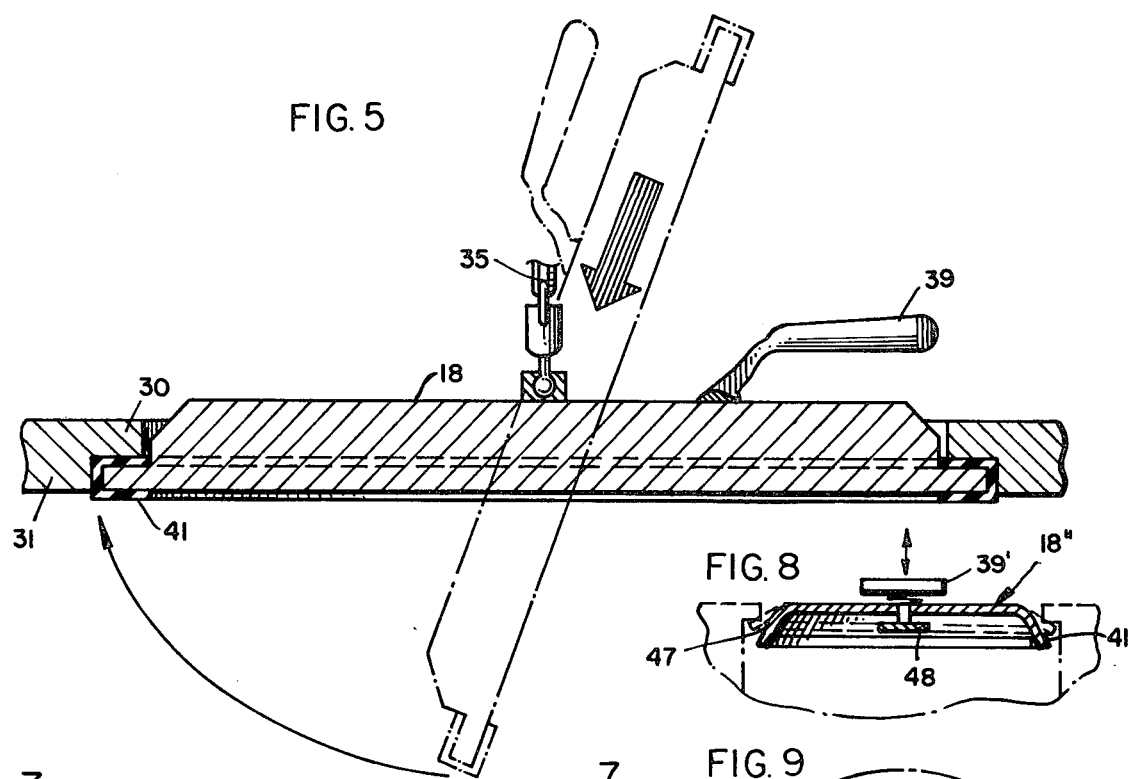
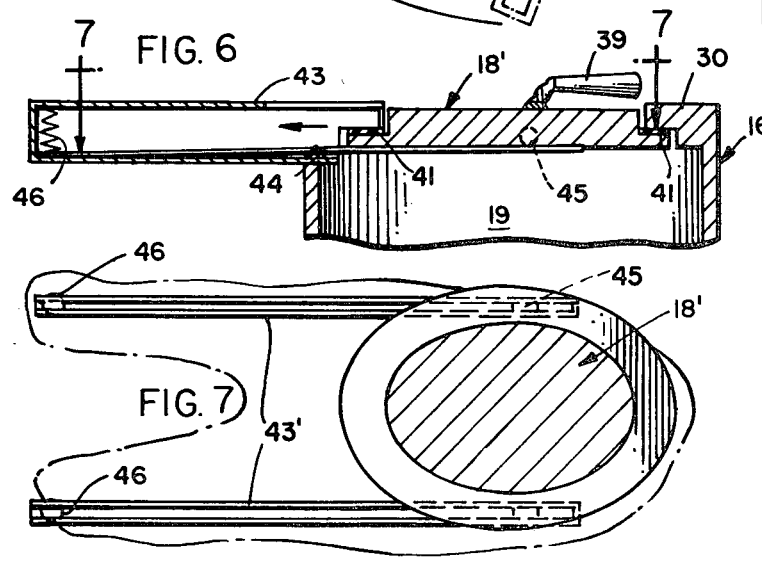
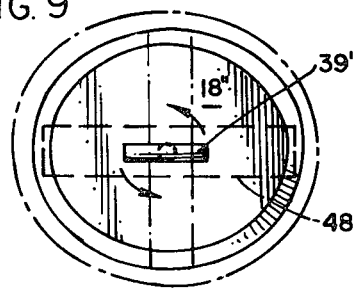

CLOSURE LID FOR CLOSING THE OPENING OF A FOOD COOKING RECEPTACLE

This application is a division of Ser. No. 184,892, filed Sept. 29, 1971, which is, in turn, a continuation-in-part of Ser. No. 793,392, filed Jan. 23, 1969, entitled METHOD OF AIR-SEALED PRESSURIZED RECEPTACLE now abandoned.

BACKGROUND OF THE INVENTION

This invention relates to apparatus for air-tight closing and sealing of the opening of a receptacle for the pressurized cooking of foods in high temperature, non-aqueous liquids.

Some types of prior art apparatus are used with the cooking chamber operating at temperatures ranging from 325° to 380° Fahrenheit, with pressures ranging from 14 to 35 psi, for cooking periods ranging from 6 to 12 minutes. The general optimum for these conditions are 35 psi at a temperature of approximately 380°F. The time periods have to be determined by the size and the nature of the food products being processed, and the desired cooking conditions of foods.

Each of the structures of these prior art devices involves some kind of closure lid for the receptacle wherein the foods are cooked. In each of these patents the closure lid is of a comparatively heavy nature, mounted on one or more heavy, upright posts anchored to the receptacle supporting framework. Such mounting requires the closure lid to swing horizontally into and out of use position to respectively seal the receptacle for the cooking operation and open the receptacle to remove the cooked foods. Aside from being expensive to make, such closure lids are bulky and considerable time is required to secure such a closure lid in and remove it from its sealed position on the receptacle.

Moreover, should one be careless in securing the closure lid in its intended sealed position, or be hasty in releasing it, the internal pressure might cause an unexpected retraction of the closure lid. This could result in a blast of hot liquid outwardly and upwardly of the cooking receptacle. Very harmful consequences could result.

This invention provides a means of sealing such high temperature, high pressure devices for cooking foods in non-aqueous liquids, wherein the temperature may reach 380° Fahrenheit and the pressure may reach 35 psi, wherein the closure is urged into tighter sealing relationship by high pressure and cannot be removed until the pressure within the cooking receptacle subsides to a safe level. Moreover, the closure is lightweight, inexpensive, and easy to use.

OBJECTS OF THE INVENTION

An object of this invention is to provide a means of sealing high pressure, high temperature cooking receptacles for cooking food in non-aqueous liquids, wherein the pressure within the receptacle is utilized to effect the seal.

It is another object of this invention to provide a closure means for sealing high pressure, high-temperature cooking receptacles for cooking food in non-aqueous liquids, wherein the closure means is positioned inside the receptacle and held in sealed, closed position solely by the pressure within the receptacle.

A further object is to provide a closure means or lid as above which may be moved into and out of receptacle sealing position either axially, radially, or both axially and radially of the receptacle.

BRIEF DESCRIPTION OF THE DRAWINGS

FIG. 4 is a perspective view showing the closure lid being inserted into or removed from the cooking receptacle;

FIG. 5 is a much enlarged view taken on the plane of the line 5—5 of FIG. 4;

FIG. 6 is a side view of a modified form of receptacle with an internally mounted closure lid;

FIG. 7 is a plan view of FIG. 6 taken on the plane of the line 7—7 of FIG. 6;

FIGS. 8 and 9 show views of another type of closure lid;

DETAILED DESCRIPTION OF THE INVENTION

Figure 1:
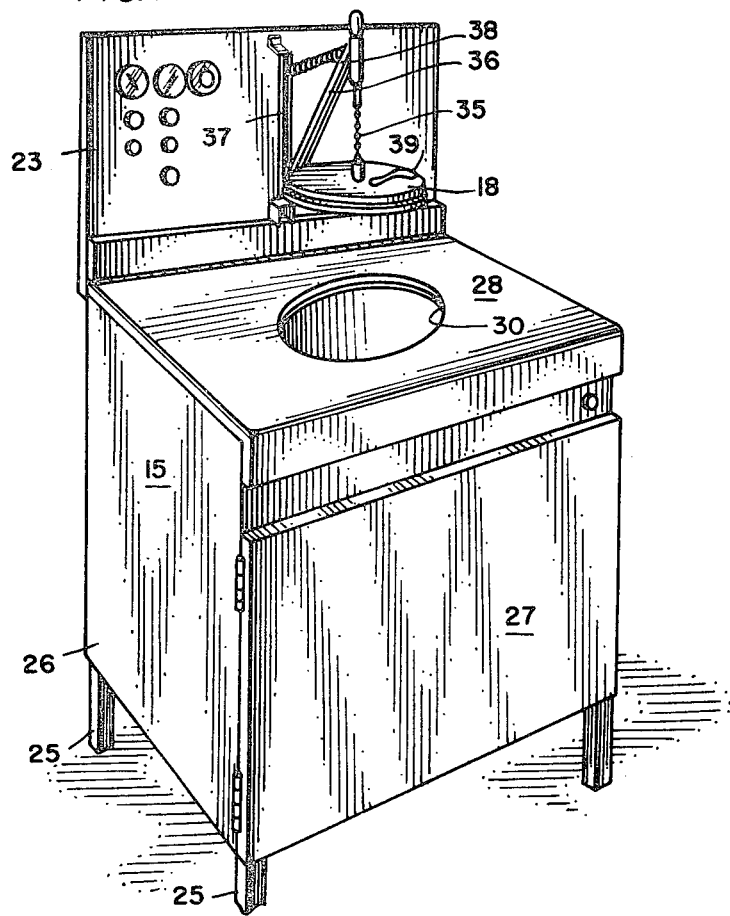
FIG. 1 is a front perspective view of a cabinet enclosed, food cooking receptacle equipped with one form of closure lid embodying the hereinbefore stated concept.

Referring now to the drawings, wherein like reference numerals refer to like parts throughout the several views, an apparatus for use with which such types of closure lids embodying the foregoing concept are required is shown in FIG. 1 and is fully described in co-pending application, Ser. No. 750,353, filed Aug. 5, 1968, now U.S. Pat. No. 3,655,411, Apr. 11, 1972. Such apparatus comprises a cabinet 15 wherein is suspended a food cooking receptacle 16 (FIG. 2) having a food inserting and withdrawal opening 17 with a closure lid 18 for sealing the cooking chamber 19 when the apparatus is in use. Associated with this receptacle are a series of facilities for heating the cooking liquid contained in the receptacle 16, creating a pressure in the cooking chamber 19 and controlling the timed cooking period.

As set forth in detail, said patent shows and describes that hot liquid is introduced into the cooking chamber, the food is placed into the chamber and hot liquid and the closure placed in closing position. The pressure immediately builds up in said cooking chamber and seals the closure. After the predetermined time cooking period, an appropriate means is actuated to immediately withdraw the hot liquid and simultaneously therewith the pressure will drop to such a point that the closure may be removed affording access to the cooked food.

The cabinet 15, as herein shown, and as described in the aforesaid co-pending application, involves a framework of angle-bars 25 mounting fixed side panels 26, a hinged front door 27 and a hinged top 28. An instrument panel 23, fixed along the rear of the cabinet 15, mounts a series of units (not shown) which control the functioning of the apparatus, as explained in the aforesaid application.

The food cooking receptacle 16, as herein shown, is a relatively heavy metal cylinder wherein the opening 17 is defined by a suitable retaining rim 30, anchored to or integrated with the receptacle.

Several adaptations of a closure lid are shown in the accompanying drawings, as noted in the foregoing figures. Whatever their respective forms and positioning, relative to the receptacle opening, they are a very significant and critical feature of this development for ensuring the facile and firm sealing of the cooking chamber 19 during the cooking operation. This primary significance of such closure lid 18 is that in use position it is located within the receptacle below the rim 30 and retained in such use position by the pressure in the cooking chamber 19 to seal the opening 17 during the cooking operation, and does not depend on separate support means for clamping the closure lid 18 in sealed position within the receptacle.

Figure 2:
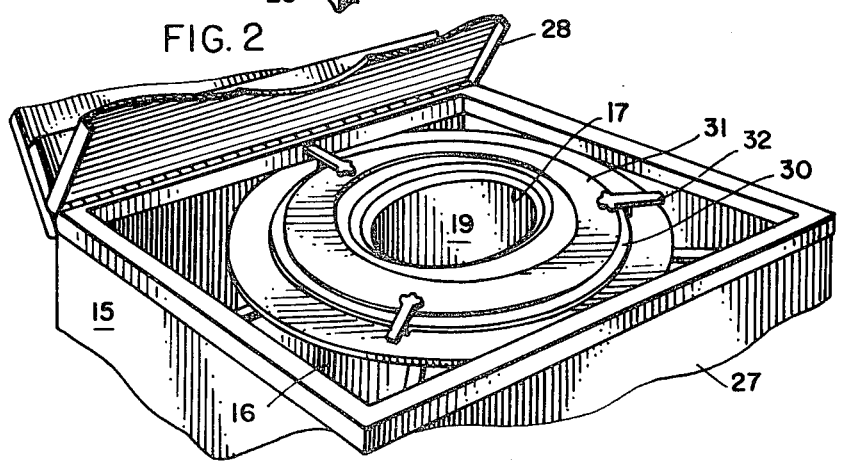
FIG. 2 is an enlarged, top perspective, with the cabinet top retracted, showing a form of receptacle retaining ring wherein the closure lid is in position to seal the opening of the cooking receptacle.
Figure 3:
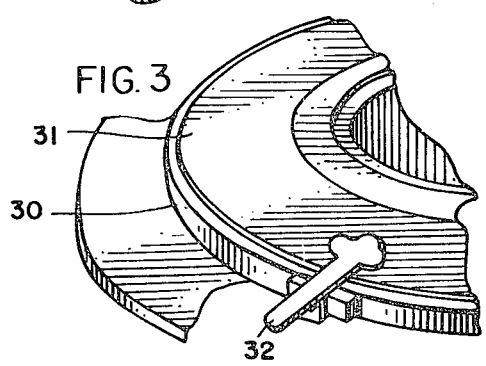
FIG. 3 is an enlarged view of a portion of the detachable locking ring shown in FIG. 2.

As shown in FIG. 2, the above noted rim 30 is integrated with a ring secured to the top of the receptacle 16. To this ring is secured an annulus 31 removably anchored by a series of retaining latches 32.

A suitable hand grip 39 is fixed on each adaptation of closure lid 18 to facilitate the shifting thereof into and out of use position. Also, a narrow peripheral ring 41, of a suitable resilient material, is fixed on the rim of each such adaptation of the closure lid 18 so that the receptacle closing position this ring ensures sealing the cooking chamber 19.

The closure lid 18 of FIGS. 1, 4 and 5 is suspended on a chord or chain 35 from an arm 36 hinged to a bracket 37 swingably anchored to the instrument panel 23. A spring 38 normally elevates the closure lid 18 into a position above the cabinet 15 and the bracket permits swinging the lid off to one side of the opening 17 to the cooking receptacle 16. Hence, when the closure lid 18 is in a retracted position, it does not interfere with the insertion of food into and its removal from the cooking receptacle 16.

The closure lid 18 of FIGS. 6 and 7 is shown elliptical in contour, as in FIGS. 1, 4 and 5. However, it could be circular in contour if preferred. Such an adaptation is shown mounted within the receptacle 16 for horizontal shifting between retracted and use positions. To that end the receptacle 16 is formed with a horizontal extension 43 wherein a pair of horizontally-spaced tracks 43' are fixed on intermediate pivots 44. The closure lid 18' mounts rollers 45 riding in the tracks 43' to permit its easy shifting into and out of receptacle closing position, as circumstances require. A pair of springs 46 at the outer ends of the tracks 43' serve to pivot the tracks 43' about pivots 44 and thus to press the closure lid 18 into initial sealing contact with the rim 30, pending the development of pressure in the cooking chamber 19, when the pressure will hold the closure lid 18' tightly in sealing contact with rim 30.

The closure lid 18'' of FIGS. 8 and 9 is made of a suitable flexible metallic material or the like and has an elliptical contour formed with a narrow offset perimeter 47. In this modification of the invention, a suitable hand grip 39' is supported on the closure lid 18''. The hand grip 39' is rotatable and mounts a bar 48 on its inner end. The length of this bar 48 is only slightly less than the longer diameter of the elliptical shaped closure lid 18''. Thus, when the bar 48 is turned across the shorter diameter of this modification of the closure lid, the outer ends of the bar 48 will press the flexible perimeter outwardly to a contour slightly larger than the contour of the rim 30 of the receptacle. This will force the rim 47 outwardly to seat the resilient ring 41 against the receptacle rim 30 for temporary position pending the development of pressure in the cooking chamber 19, as before.

Figure 10:
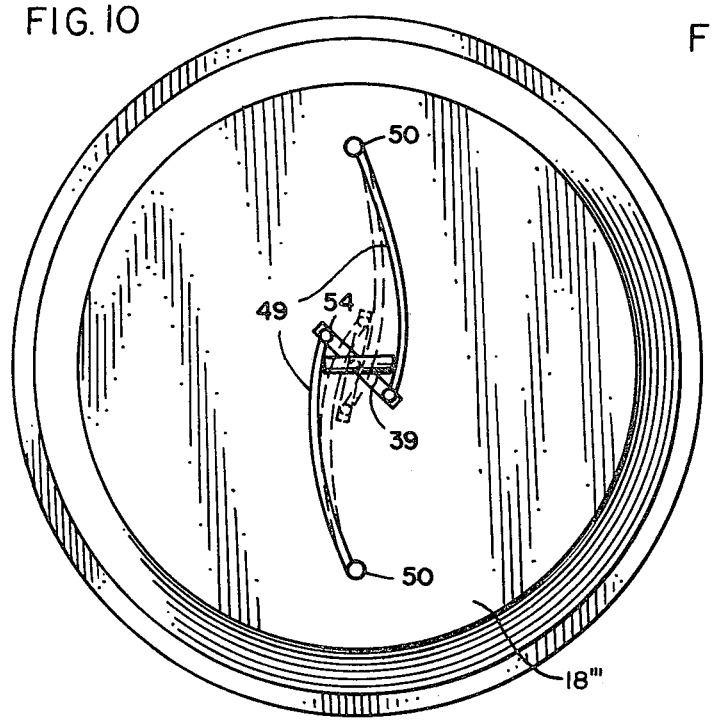
FIGS. 10 and 11 show adaptation of closure lid 18 similar to FIGS. 8 and 9 but being of circular contour.
Figure 11:
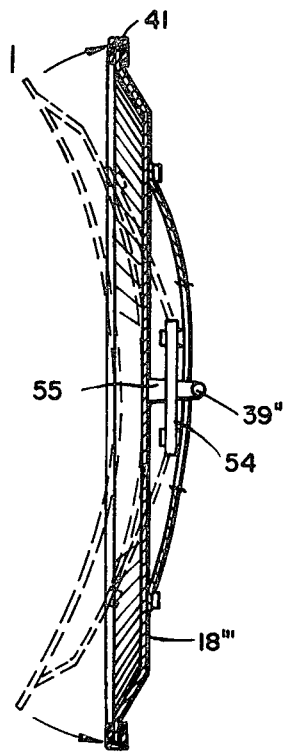

A further modification 18''' of the closure lid is shown in FIGS. 10 and 11, illustrated in much larger dimension and without association with a receptacle 16 in order to more clearly indicate the facility whereby it is capable of the required flexing to enable its insertion through opening 17 and removal from and its movement into sealing contact with rim 30. This modification is made of a suitable flexible metallic material and has a normally concave configuration of circular contour. A centrally mounted hand grip 39'' is journaled on a hub 55 fixed to the closure lid 18'''and mounts a plate 54 attached to a pair of arcuate shaped resilient rods 49 which are anchored at their exterior ends to diametrically oppositely positioned pins 50 on the closure lid.

Figure 12:
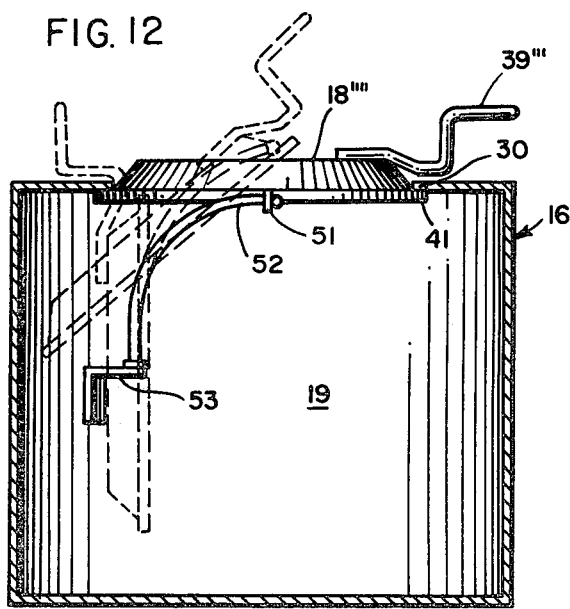
FIGS. 12 and 13 show a further adaptation of closure lid mounted within the receptacle for shifting between vertical retracted and horizontal in-use positions.
Figure 13:
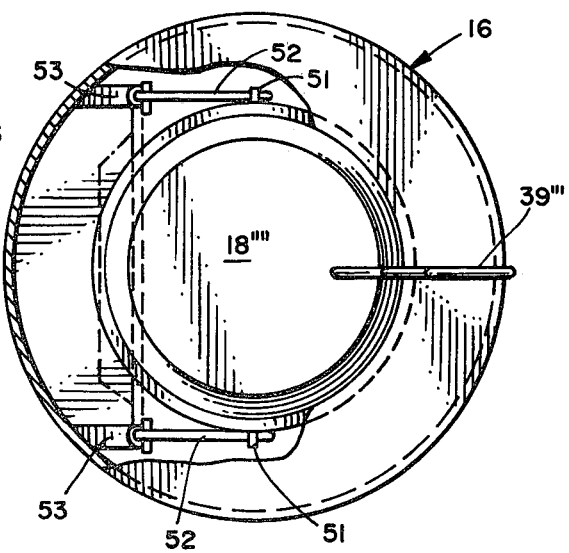

An even further modification 18'''' of the closure lid is shown in FIGS. 12 and 13 and is circular in contour with a cross-sectional shape substantially as that of FIGS. 4 and 5. In this instance, the closure lid 18'''' is shiftably supported by means of eyelets 51 on a pair of arched, resilient rods 52 mounted on the receptacle 16 in spaced apart, parallel relationship. The two parallel rods 51 and 52 are secured at their inner ends by angle brackets 53 to the interior of the receptacle 16 with the upper arched portions disposed horizontally and free to permit flexing of the rods. A hand grip 39''' is fixed to the closure lid 18'''' and positioned to permit the shifting of the closure lid 18'''' between a vertically retracted position within the receptacle 16, shown in phantom lines, and an in-use horizontal position, as shown in full lines.

With the closure lid of any of the aforedescribed modifications in place, the apparatus is ready for use to cook food as explained in greater detail in the aforesaid co-pending application, Ser. No. 750,353, now U.S. Pat. No. 3,655,411.

The operational use of the several closure lid modifications described herein is substantially the same.

When the receptacle 16 is ready for use to the point of having a batch of food placed in the cooking chamber 19, the closure lid according to any of the modifications is placed in position inwardly below the opening 17 to seat the resilient ring 41 in contact with the inner face of the rim 30, as shown in FIGS. 5, 6, 9 and 12. This being effected, the requisite instruments on the panel 23 are set to initiate the requisite pressure, temperature and timed cooking conditions in the cooking chamber 19. Almost instantly, the interior pressure condition in the receptacle chamber 19 will press the closure lid firmly against the rim 30 and secure it in such position throughout the timed cooking period.

At the end of the timed cooking period, the pressure in the chamber 19 is reduced in a suitable manner as determined by an appropriate means, not shown, controlled from the instrument panel 23 and the closure lid may be retracted to permit the removal of the cooked food.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

We claim:

1. A closure lid for closing and sealing against the rim of an opening to a cooking chamber of a pressurized cooking receptacle for cooking food under pressure in high temperature non-aqueous liquid, said opening having a peripheral sealing rim therearound within the receptacle, said closure lid having a peripheral sealing surface and being insertable in and removable through said opening for selective closing and opening relationship relative thereto, a support mounted to the receptacle, a swingable bracket means mounted to the support for swinging movement relative to the receptacle, a closure lid support arm, means pivotally mounting the support arm to the bracket means for swinging movement of the arm with the bracket means and for pivotal movement of the arm relative to the bracket means, said closure lid carried by the support arm for movement with the support arm, and resilient means connected with the support arm for urging the support arm upwardly and thus urging the closure lid upwardly against the sealing rim into operative position until pressure in the receptacle increases to an amount sufficient to urge the closure lid into tight, sealing relationship relative to the rim, and said resilient means resiliently biasing the support arm and closure lid up and away from the opening when the closure lid is removed therethrough.

2. A closure lid as in claim 1, wherein said bracket means is swingable about an axis parallel to the axis of the opening whereby said closure lid and its support arm may be moved to the side away from the opening.

3. A closure lid as in claim 2, wherein a flexible chain connects said closure lid to the support arm for suspending the closure lid from the support arm.

4. A closure lid as in claim 3, wherein said closure lid and said opening are ellipitical in contour, said closure lid being larger than said opening.

5. A closure lid as in claim 1, wherein said closure lid and said opening are elliptical in contour, said closure lid being larger than said opening.

6. A closure lid as in claim 3, wherein said closure lid is relatively rigid, and a resilient seal is on the periphery of said closure lid in a position to cooperate with the rim of said opening to effect an air tight seal therewith.

7. A closure lid as in claim 6, wherein a handle means is on said closure lid and normally projects above said opening to enable said handle means to be grasped for positioning said closure lid.

* * * * *